Dec. 5, 1950　　　　　　E. G. WHITE　　　　　2,532,382
CONSTANT TEMPERATURE MAINTENANCE SYSTEM
Filed Nov. 5, 1945　　　　　　　　　　　　　4 Sheets-Sheet 1
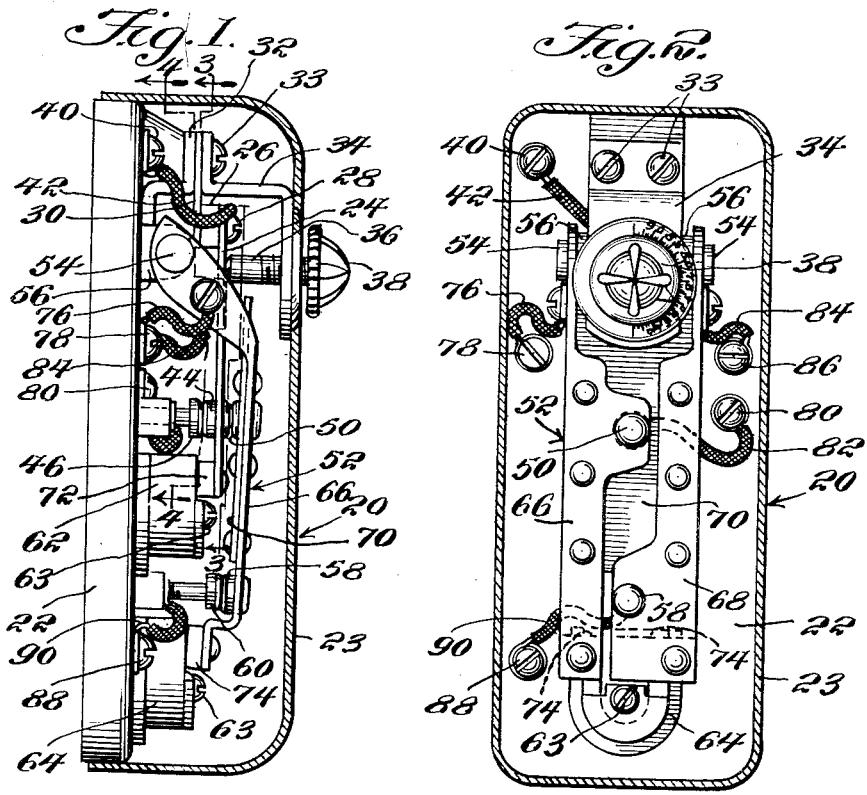
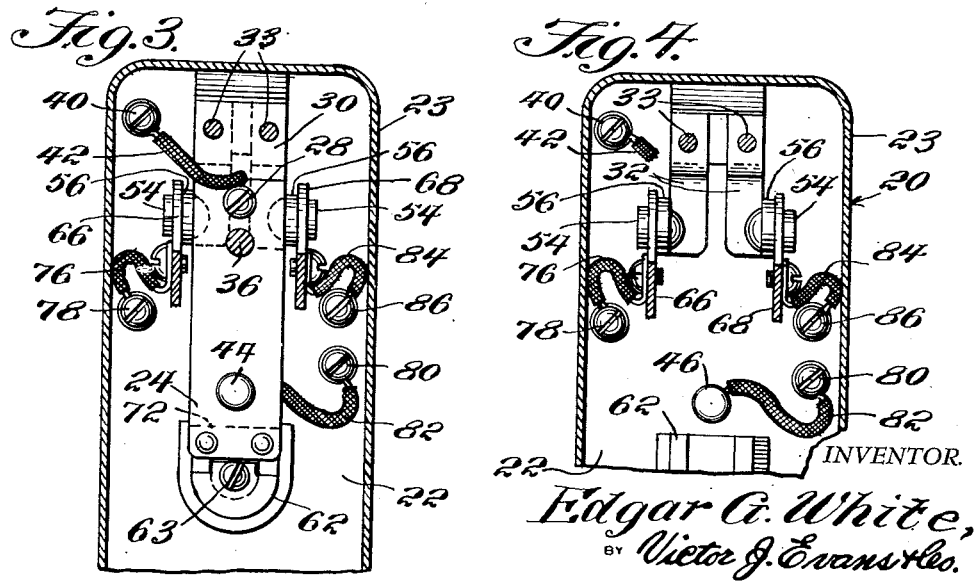
INVENTOR.
Edgar G. White,
BY Victor J. Evans & Co.
ATTORNEYS

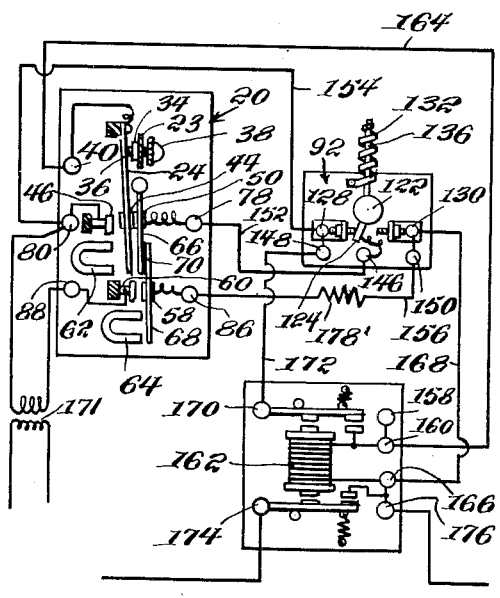
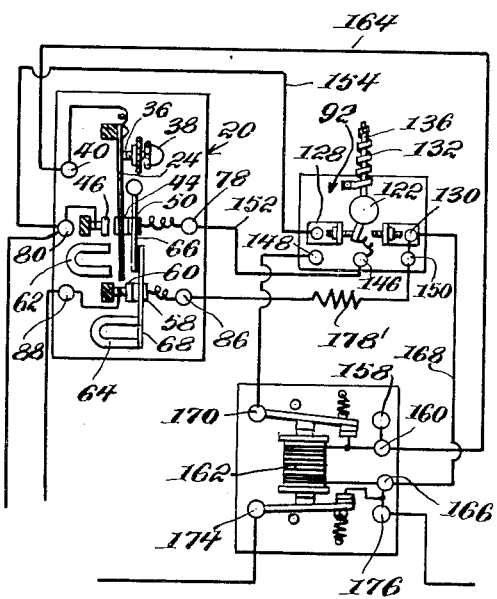
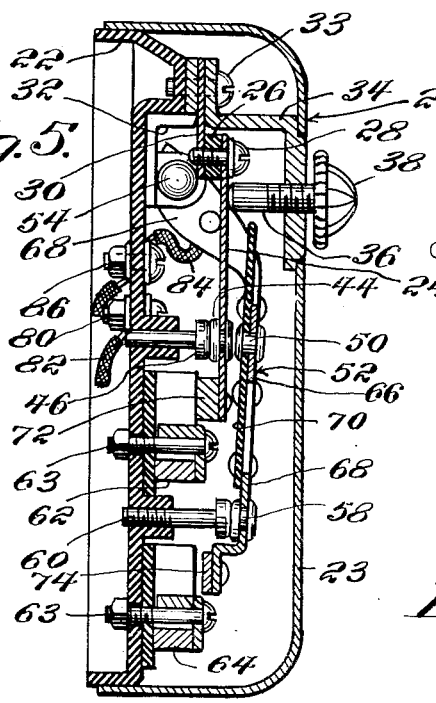
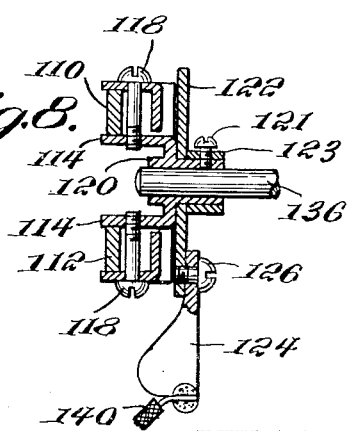

Dec. 5, 1950  E. G. WHITE  2,532,382
CONSTANT TEMPERATURE MAINTENANCE SYSTEM
Filed Nov. 5, 1945  4 Sheets-Sheet 3
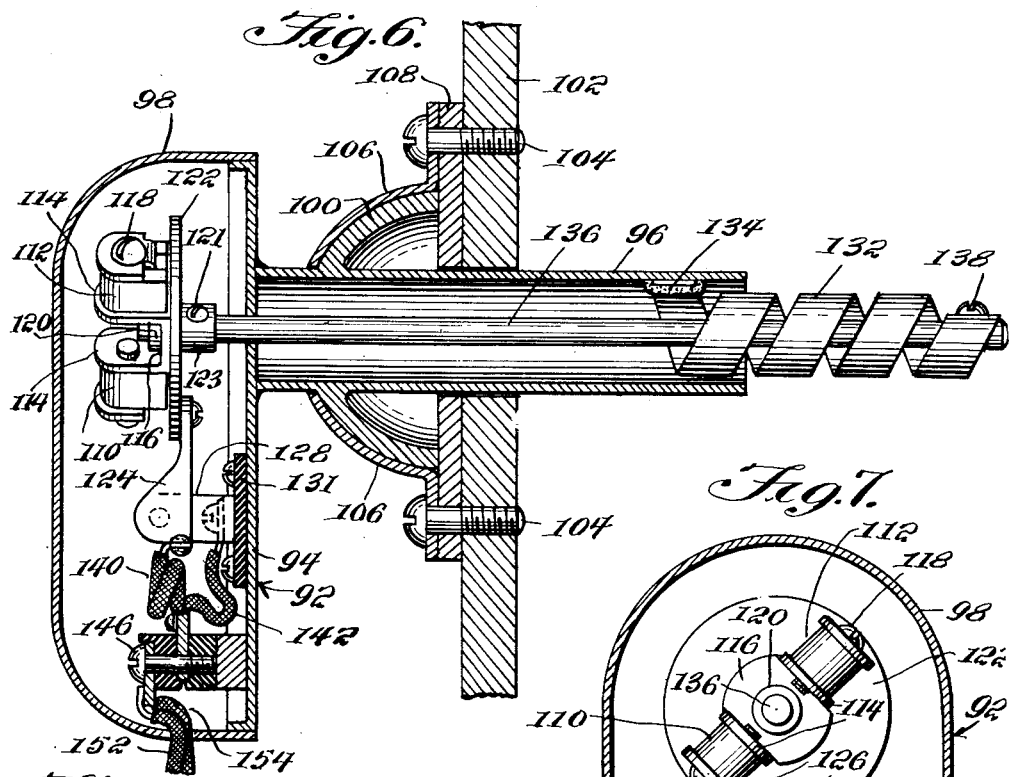
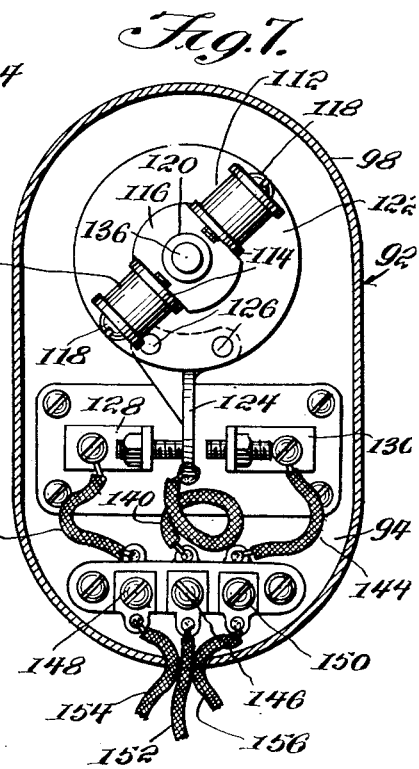
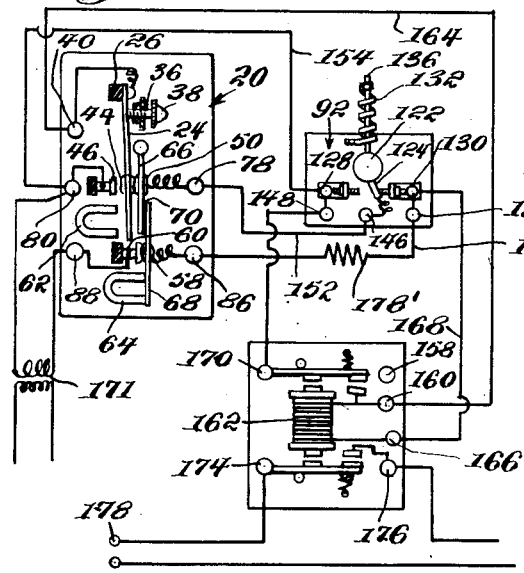
INVENTOR.
Edgar G. White,
BY Victor J. Evans & Co.
ATTORNEYS

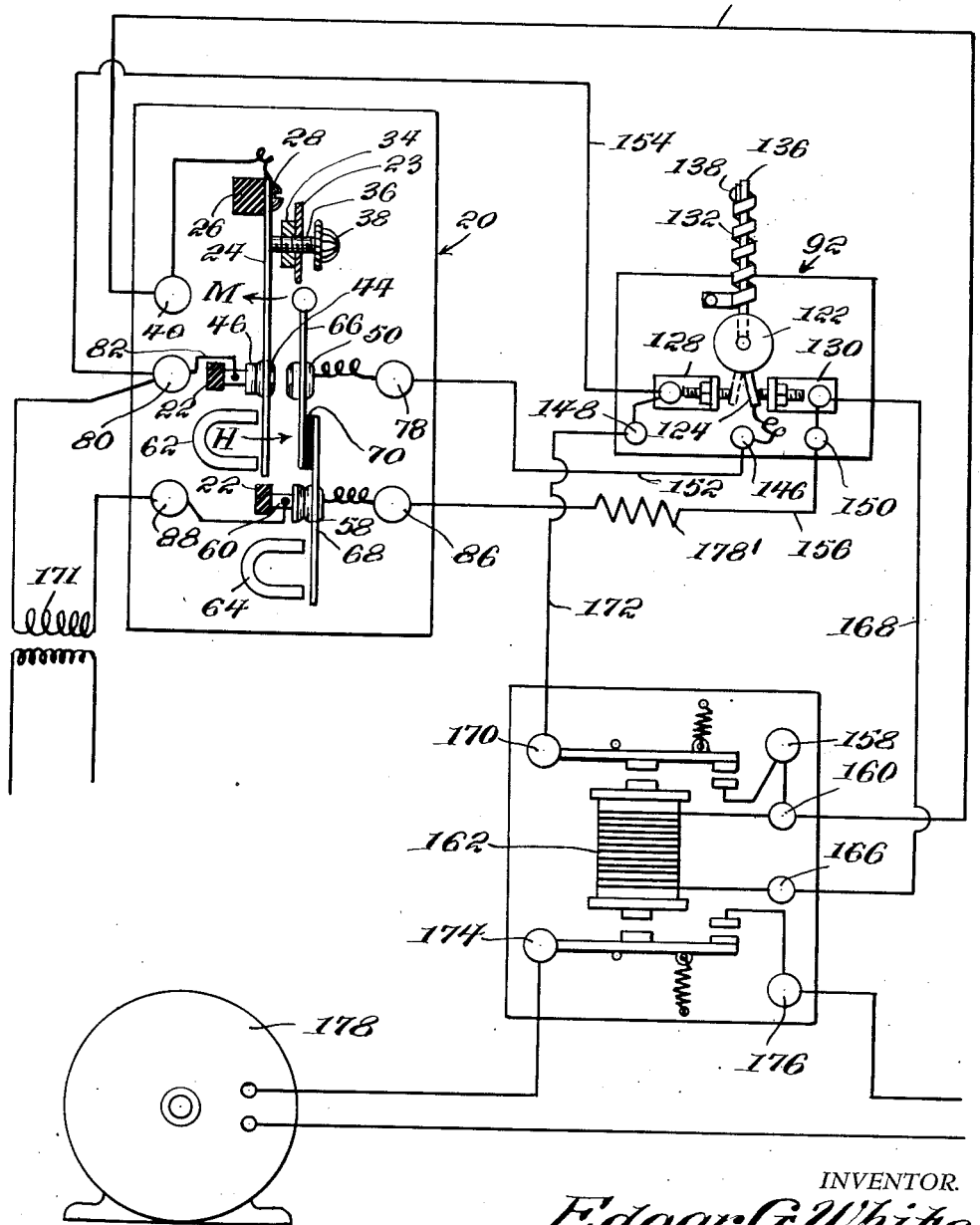

Patented Dec. 5, 1950

2,532,382

UNITED STATES PATENT OFFICE 2,532,382

CONSTANT TEMPERATURE MAINTENANCE SYSTEM

Edgar Guy White, Peru, Ill., assignor to Sampsel Time Control, Inc., Spring Valley, Ill., a corporation of Illinois Application November 5, 1945, Serial No. 626,606

6 Claims. (Cl. 236—9)

This invention relates to control devices and particularly to automatic means for perception of temperature operating range whereby to maintain a heat reserve at a central plant within limits to accord with transient weather conditions.

With conventional types of automatically fired heating plants there has been no reliable means known which would prevent overheating (or overshooting as it is sometimes called) of the heating media following long heat demands such as is incident to sharp temperature fluctuation. Various practices to overcome this condition of overrunning the heating cycle have been proposed but because the control factors required too constant attention to admit of proper regulation, certain benefits of automatic operation have thereby become lost or ineffectual during critical conditions which obtain at seasonal temperature fluctuation.

It is the object of this invention to provide a means of automatic mean temperature change perception and to modify heat regulation extremities so as to maintain a constant desired heating temperature. The heat reserve controlling device being a temperature responsive member is located in the bonnet or boiler head of the heating medium. A thermostat is used to control directly the heat source, whereby not only to operate a heating medium, but also to regulate the reserve temperature limiting device located in the heating medium.

The invention will be better understood from the following detailed description thereof with reference to the accompanying drawings, in which:

Figure 1 is a side elevational view of a thermostat with the cover thereof in section such as may be used in an embodiment of the invention;

Figure 2 is a front elevational view of the unit featured in Fig. 1 with the cover transversely in section;

Figure 3 is a fragmentary sectional view taken approximately on the line 3—3 of Figure 1;

Figure 4 is a fragmentary sectional view on the line 4—4 of Figure 1;

Figure 5 is a vertical sectional view similar to Fig. 1 but taken on a line approximately through the center of Fig. 2;

Figure 6 is a transverse sectional view through the temperature control apparatus and bonnet immersion attachment thereof featuring the clutch and variable limit control which is used in an embodiment of the invention;

Figure 7 is a front view of the apparatus shown in Figure 6 with the cover in section;

Figure 8 is a fragmentary detailed sectional view through the magnetic clutch elements thereof;

Figure 9 is a schematic diagram of a temperature control system embodying the invention with the control and contact elements in their related positions;

Figure 10 is a circuit diagram similar to Figure 9 featuring a condition of change when the room has reached the desired temperature;

Figure 11 is a similar diagram featuring a condition when the room has reached a point above the desired temperature, and Figure 12 is the same diagram under conditions when the room reaches the desired temperature and the system is re-set.

Referring more in detail to the drawing, and especially to Figures 1 to 5 inclusive, the numeral 20 designates a room thermostat having an insulated base 22 and a snap-on cover 23 which may be frictionally retained.

The thermostat employs a bi-metal blade 24 secured at its upper end to an insulated block 26, Figs. 1 and 5, by means of the screw 28 and at its lower end carries an iron or steel abutment piece 72. The block 26 is supported upon the plate 30 and secured to the brackets 32 and 34, Fig. 5, by screws 33, the brackets 32 being secured to the base 22 in any well known manner. The bracket 34 engages the inside of the cover 24 and threadably supports the stem 36 of the control knob 38, which is radially graduated in terms of temperature degrees.

The blades 24 and 34 are electrically connected to the terminal 40 by the wire 42 and the former is adjusted to afford any temperature response desired by rotating insulation knob 38 which applies or releases pressure on the blade 24 by withdrawing or extending the stem 36 which engages the blade 24, as shown in Figs. 1 and 5. Upon a slight rise in temperature, the blade 24 deflects to move the contact 44 thereon out of engagement with the contact 46 mounted on the base 22 and into engagement with the contact 50 on the pivoted arm 52 which is pivotally mounted at 54 in the oppositely disposed ears 56 of the bracket 32. Upon a further rise in temperature the blade 24 applies pressure outwardly moving the arm 52 bodily and thus disengaging the contact 58 carried thereby from the contact 60 secured to the base 22. Upon drop of 1° F. switch 60 is again engaged by the contact 58, the contact 44 remaining in engagement with the contact 50 until an additional drop of 1° F. disengages the aforementioned contacts and re-engages the contact 44 with back contact 46.

Blade 24 and arm 52 are detented by the poles of permanent horse-shoe magnets 62 and 64 respectively, which in turn are secured to the base 22 by fastener 63.

The arm 52 comprises two brass pieces 66 and 68 respectively, which are pivoted, as previously described, and as they form a part of the electrical circuit, they are secured to an insulated strip 70 and being spaced, as shown, are insulated from each other. Steel members 72 and 74 are riveted on the ends of the blade 24 and arm 52 respectively, to provide magnetically attractive material for detenting.

The brass piece 66 of the arm 52 is electrically connected at its upper end by the wire 76 with the terminal 78, the contact 46 to the terminal 80 by the wire 82. The brass piece 68 of the arm 52 is electrically connected at its upper end by the wire 84 with the terminal 86 and the contact 60 with the terminal 88 by the wire 90.

Referring more particularly to Figures 6, 7 and 8, wherein is shown an improved clutch and variable limit control unit 92 which comprises the base 94 having the insert tube 96 secured to the base 94 and a cover 98 frictionally engaging the rim of the base 94. The housing 96 is provided with the semi-spherical flange 100 which is secured to the furnace bonnet of heat supplying means 102 by screws 104, retaining the semi-circular bracket 106 in engagement with the sleeve 108, the plate 108 being interposed between the bracket 106 and the furnace bonnet of heat supplying means 102. The friction for the control being applied by the use of two magnets 110 and 112 respectively, which are secured to the upturned ears 114 of the brass top plate 116 by screws 118. The plate 116 is fixed on the bushing 120 and the circular plate 122 is loosely mounted on the bushing 120 intermediate the plate 116 and the collar 123 secured to the bushing 120 by screw 121. The plate 116 carries an arm 124 secured thereto by screws 126. The arm 124 is movable between contacts 128 and 130, when the plate 116 is coupled to the plate 122 by the permanent magnets 110 and 112. The magnets apply a yieldable force to rotate the arm 124 between the contacts 128 and 130 which are mounted on the insulated plate 131 in response to temperature changes acting on the bi-metal helix 132 one end of which is welded to the interior of the housing 96 at 134 and the other end of which is secured to the shaft 136 by a screw 138. Thus, action of the helix 132 is transmitted by the shaft 136 to the plate 116. Leads 140, 142 and 144, respectively, connect the arm 124 and contacts 128 and 130 to the terminals 146, 148 and 150, and thereafter to the leads 152, 154 and 156.

Referring now in detail to Figures 9, 10, 11 and 12, the terminal 46 is connected to terminal 158 and 160 of relay coil 162 by lead 164. Terminal 80 of the thermostat 20 is connected through secondary winding 171 of a transformer and contact pair 58—60 to terminal 150 of control 92 and to terminal 166 of relay 162 by leads 156 and 168. Terminal 78 of the thermostat 20 is connected to terminal 146 of the control 92 by lead 152, and to contactor 124. Terminal 86 of thermostat 20 is connected to terminal 150 of control 92 by lead 156. Terminals 174 and 176 of relay 162 close the circuit of stoker motor, oil burner, or motorized valve 178.

The function of the thermostat 20 is as follows: Upon rise of temperature in the space to be heated, the bi-metal blade 24 deflects in direction indicated by arrow H Figure 9, until the temperature for which it is adjusted has been reached. At this point, the contact 44 draws away from back contact 46 and engages instead front contact 50. Upon further rise of temperature member 70 is pivoted about its trunnion screws 54 until contact 58 of conductor plate 22 draws away from its pole contact 60. This opens the circuit Fig. 9, which had been energizing relay 162.

The function of the friction driven temperature limit control is as follows: Upon rise of bonnet or boiler head temperature, the contact arm 124 oscillates counterclockwise, Fig. 9, contacting terminal 130. Contact arm 124, upon contacting terminal 130, is thereby physically prevented from moving further. The magnetic friction coupling then slips until the heater reserve temperature ceases to rise. Upon drop of temperature, arm 124 leaves terminal 130 and contacts terminal 128. The same type of coupling behavior then occurs until the reserve heat temperature ceases to drop.

The function of relay 162 is as follows: When a heat calling circuit is completed by thermostat 20, the winding of relay 162 is energized over lines 164 and 168 as already described causing both its armatures to draw up. This establishes a holding circuit over line 172 and an operating circuit for the fuel motor 178. The locking circuit remains energized holding relay 162 closed until the contacts 58 and 60 of thermostat 20 come ajar.

The control knob of thermostat 20 is set to the temperature desired in the space to be heated. If the ambient temperature is lower than this setting, blade 24 will assume a condition as shown in Figure 9 closing the already described circuit which energizes relay 162. As a consequence there are established its own holding circuit and the fuel motor operating circuit. Continued operation of the fuel motor will build up a heat reserve in the furnace or boiler, until a predetermined increase in heat reserve is achieved whereupon the arm 124 of control 92 will draw away from contact 128 and engage instead contact 130. The magnetic friction drive will permit the arm 124 to slip after it has contacted terminal 130 until the reserve temperature ceases to rise. Eventually the space will become heated and the bi-metal blade 24 of the thermostat will move in the direction of arrow H. Since blade 24 is magnetically attracted by its associated horseshoe magnet 62 influencing said blade in a leftward direction, Fig. 9, until the heating effect on its bi-metallic structure sets up sufficient counter-force to draw away from its magnet 62, it will be understood that when such force eventually becomes adequate to overcome the magnetic effect and move the blade rightwardly, such force will necessarily be of sufficient magnitude to thrust contact 44 of blade 24 physically into engagement with the front contact 50. This will establish an energizing circuit for magnet 162 subject to completion when contactor 124 of unit 92 engages its left contact point 128 as during interim low heat reserve conditions in the furnace or boiler with which unit 92 is associated. The stated operating circuit for magnet 162 is traceable from the left hand terminal of secondary winding 171 through terminal 80, line 154, terminal 128, contactor 124, line 152, terminal 78, front contact 50, contact 44 including blade 24, terminal 40, line 164, terminal 160, winding of magnet 162, terminal 166, line 168, terminal 130, line 156, current limiting resistor 178', terminal 86, contacts 58 and 60, terminal 88, to the other end of the secondary winding 171. The aforedescribed condition is illustrated in the schematic circuit of Fig. 12 and in accordance therewith magnet 162 will remain energized so long as the bonnet or boiler temperature remains low, causing the firing apparatus to endeavor to raise the temperature to a range within the established angular manifestation of contactor 124.

If under the aforedescribed conditions, the reserve heat temperature is significantly lowered to cause shaft 136 and the magnetic clutch elements 116, 112, and 122, to slip as the contactor 124 encounters adjustable screw of terminal 128, a change will be wrought upon the previously established temperature range condition in the unit 92. Eventually, however, the reserve heat temperature will rise through the efforts of the heating apparatus represented by the fuel motor 178 until the contactor 124 will draw away from its left hand contact terminal 128, opening the aforedescribed circuit and deenergizing relay 162 because at this time the relay locking circuit described above will be found open at contacts 58—60 of the heat demand thermostat 20 by reason of the action of blade 24 pressing upon contact 50 with sufficient force to draw member 70 away from its magnet 62. If, however, the ambient temperature of thermostat 20 meanwhile falls so as to permit contacts 58 and 60 to close, the holding circuit for relay 162 will remain closed, relay 162 will continue energized, the firing of the furnace or boiler will continue until the locking circuit is opened at contacts 58—60.

It is to be understood, therefore, that so long as no heat demands are made by the unit 20, the immersion thermostat 92 will maintain a heat level in the bonnet or boiler corresponding to the angular fluctuation range of contactor 124 between contact 128 and contact 130. The frictional characteristic of the clutch in thermostat 92 permits this temperature range to be automatically displaced within a wider overall temperature range according to prevailing weather conditions. Thus during mild temperature conditions the reserve heat range level may be maintained at, for example, between 120° and 145° F. During more severe or colder seasonal conditions the reserve temperature range may be advanced to fluctuate between 180° and 205° F. This displacement will occur notably as an automatic response to changes in general temperature conditions and without the intervention of human agency regardless of whether the ambient temperature conditions rise or fall as a result of weather change.

It is apparent that if a definite ratio of deflection between the bi-metal of the thermostat and the temperature responsive member of the friction driven temperature limit control is established, i. e., assuming a 15° change in means supplying heating medium temperature will permit ½° change in temperature in the space to be heated, then with a temperature responsive member which will move the contact arm 124 from the terminal 130 to the terminal 128, or vice versa, on a 10° change in means supplying heating medium temperature, it is obvious that the temperature in the space to be heated will be held within ½° temperature variation.

In the use of a day-night thermostat, where the temperature is lowered at a desired time at night and must be brought again to the desired temperature in the morning, there will be an excess of heat, or overshooting, in the first cycle. This condition is corrected in this manner: Because of the excess heat, or overshooting, the bi-metal blade 124 will deflect in the direction of arrow H opening contacts 88 and 80. For example: If it requires ½° to cause the bi-metal to deflect sufficiently to open the terminals 88 and 80 above the first stage (or condition in which terminals 88 and 80 are closed), then working backwards, this ½° corresponds to a 15° excess temperature in the heating medium. And, since terminals 88 and 80 are open, means supplying heating medium is inoperative until the ½° temperature change has occurred in the space to be heated, permitting the bi-metal blade 124 to return to the first position, i. e., terminals 88 and 80 and terminals 40 and 86 closed. During this period of time, the temperature change in the heating medium has preceded the temperature change in the space to be heated. Thus, contact arm 124 of control 92 moves to contact 128 which prevents it from moving any further, allowing the friction driven temperature limit control to slip, setting the position of contact arm 124 at a lower operating temperature than the first setting which resulted in the overshooting. Terminals 88 and 80 of the thermostat 20 closing simultaneously with terminals 40 and 86 of the thermostat 20, the means supplying heating medium will be energized, causing temperature in said means to rise until terminal arm 124 of control 92 (actuated by heating medium at means of supply), contacts terminal 120. This shunts the relay coil de-energizing the relay permitting contacts 170 and 158 and 174 and 176 to open, stopping the means supplying heating medium.

The heat generating medium is now being entirely controlled by the control 92. If a furnace or boiler temperature change of 15° (or less) must be held to maintain a room temperature not varying more than ½°, then a differential of 10° between terminals 40 and 78 will keep the temperature in the space being heated within ½°, at the setting which the thermostat has just effected. Should there be a demand for more heat because of external influences (or otherwise), bi-metal blade 24 will deflect in the direction of arrow M closing the circuit through terminals 40 and 78. This opens the relay de-energizing circuit so that the rising heating medium temperature which has caused contact arm 124 to contact terminal 130 of the control 92 means supplying heating medium will continue to operate, re-setting contact arm 124 to a higher temperature demand, until bi-metal blade 24 is satisfied, deflecting in the direction of arrow H opening the circuit through terminals 40 and 78 of the thermostat 20, and closing circuit through the terminals 40 and 86 of the thermostat through arm 124 and contact 130 of the control 92. This de-energizes the relay coil 162 and opens means supplying heating medium circuit.

The foregoing specifications with the accompanying drawings are presented for the purpose of describing and illustrating the broad principles of this invention, and as various modifications are possible without departing from the spirit of the invention, it is to be understood that the invention is not restricted by reason of the specific construction or application disclosed, or otherwise than by the appended claims.

I claim:

1. In an automatic heating system, an electrically operated heat generating apparatus, a thermostatic device having a thermal element disposed in a heat reserve storage space of said apparatus including a pair of oppositely placed electrical contacts, a contactor movable between and alternatively engageable with said pair of oppositely placed contacts, a friction coupling between said thermal element and said movable contactor, a room thermostat comprising a heat responsive contactor movable between a stationary heat calling contact and a floating heat satiety contact, a shiftable member in said room thermostat carrying electrically insulated one from another said heat satiety contact and a locking circuit contact, a stationary contacting point cooperating with said locking circuit contact, detent means for influencing said shiftable member to present its carried locking circuit contact into engagement with said locking circuit stationary contact, an electric relay controlling a heat generating apparatus contact and a self-locking contact, and an energizing circuit for said relay including, in circuit communication, said room thermostat heat calling contact, said room thermostat locking circuit contact, said locking circuit stationary contact, and a shunt path for said relay including said thermostatic device contactor and one of its said pair of oppositely placed contacts for de-energizing said relay to arrest further operation of said heat generating apparatus in response to a heat sufficiency signal movement by said thermostatic device contactor, and a secondary energizing circuit for said relay including the other of said pair of oppositely spaced contacts and the floating heat satiety contact.

2. In an electrical control system for automatically fired heating plants, a room thermostat having a bimetallic member movable between heat calling and heat satiety contacts, primary circuit means electrically connected to said bimetallic member when in its said heat calling contact position for energizing an electric relay, an electric relay under control of said primary circuit means having a control armature for energizing a plant firing apparatus and a locking armature for maintaining itself closed after its energization is initiated by said room thermostat member, a secondary member in said room thermostat carrying a front contact for engagement with said bimetallic member when the latter is in its said heat satiety contact position for preparing a secondary energization circuit for said electric relay, and carrying an additional contact in circuit with said electric relay, said secondary member being shiftable by movement of said bimetallic member in the direction of but beyond its heat satiety contact position whereby to cause said secondary member additional contact to open the locking circuit to said electric relay.

3. The combination set forth in claim 2, including a reserve heat thermostatic device having a thermal element and a contactor movable thereby between alternative contacting positions, a friction coupling between said thermal element and said movable contactor, and a contact engageable by said contactor for completing said secondary energization circuit for said electrical relay whereby to energize said relay for initiating said plant firing apparatus independently of the heat calling contact of said room thermostat and in response solely to reserve heat conditions.

4. In a heating control system, a room thermostat comprising a biased thermostatic contact element movable between a relay energizing call circuit contact and a secondary arm contact, a biased secondary arm carrying electrically insulated from each other, a bonnet thermostat contactor and a call circuit common return contactor and movable in opposition to its bias during overtravel of said room thermostat contact element away from a common return circuit contact, a bonnet thermostat located in a heat reserve chamber of a heat generator having a thermostatically responsive contactor slip clutch coupled to its thermostatic element and electrically connected to said secondary arm bonnet thermostat contactor and movable between a cool side call circuit making contact and a hot side relay shunt circuit contact, and an electromagnetic relay energizable by the call circuit when initiated by said room thermostat or when maintained by said bonnet thermostat for operating the heat generator and having a self-energizing lock contact pair for establishing a holding circuit parallel to the call circuit of said room thermostat contact element.

5. The combination set forth in claim 4 including a shunt resistor in said call circuit common return for relieving the short circuit load when said bonnet thermostat contactor engages its hot side contact to shunt and release said relay.

6. In a heating system control apparatus, a room thermostat, a bonnet thermostat, and a furnace operating relay, a magnetically biased contactor in said room thermostat movable between relay energizing and bonnet control contacts in response to cool and hot ambient temperature room conditions, respectively, a biased contact lever in said room thermostat supporting a first contact strip for electrical engagement by said biased contactor when the latter moves into its bonnet control contact position in response to rising ambient temperature room conditions and carrying a second contact strip which engages during the normal or biased condition a common return making contact, said biased contactor being movable in the direction of its bonnet control contact in response to overheat temperature conditions to overpower the bias of said contact lever for opening its common return making strip, a contactor in said bonnet thermostat frictionally articulated with its thermostat element and electrically connected to said first contact strip, said bonnet contactor being movable between a relay energizing secondary circuit path contact which is alternative to said room thermostat relay energizing contact during low limit temperature bonnet conditions and a relay shunting contact in parallel with a relay locking circuit during high limit temperature bonnet conditions.

EDGAR GUY WHITE.

REFERENCES CITED

The following references are of record in the file of this patent:

UNITED STATES PATENTS

| Number | Name | Date |
|---|---|---|
| 1,583,586 | Fischer | May 4, 1926 |
| 1,807,210 | Hinnekins | May 26, 1931 |
| 1,960,718 | Standifer | May 29, 1934 |
| 2,069,002 | Beman | Jan. 26, 1937 |
| 2,117,514 | Shipley | May 17, 1938 |
| 2,148,491 | Moore | Feb. 28, 1939 |
| 2,153,195 | Lilja | Apr. 4, 1939 |
| 2,164,352 | Sargent | July 4, 1939 |
| 2,189,382 | McGrath | Feb. 6, 1940 |
| 2,219,441 | Carnes | Oct. 29, 1940 |